United States Patent
Soulanille

(10) Patent No.: US 7,702,672 B2
(45) Date of Patent: Apr. 20, 2010

(54) SYSTEM AND METHOD FOR CONDUCTING AN AUCTION-BASED RANKING OF SEARCH RESULTS ON A COMPUTER NETWORK

(75) Inventor: Thomas A. Soulanille, Pasadena, CA (US)

(73) Assignee: Yahoo! Inc., Sunnyvale, CA (US)

( * ) Notice: Subject to any disclaimer, the term of this patent is extended or adjusted under 35 U.S.C. 154(b) by 0 days.

(21) Appl. No.: 12/473,663

(22) Filed: May 28, 2009

(65) Prior Publication Data

US 2009/0240600 A1  Sep. 24, 2009

Related U.S. Application Data

(63) Continuation of application No. 10/226,103, filed on Aug. 22, 2002, now Pat. No. 7,555,485.

(51) Int. Cl.
*G06F 17/30* (2006.01)
(52) U.S. Cl. .................. 707/706; 705/14.4; 705/14.54; 705/14.68; 705/14.71
(58) Field of Classification Search .......... 707/999.002, 707/999.003, 999.1; 705/14
See application file for complete search history.

(56) References Cited

U.S. PATENT DOCUMENTS

| 5,659,732 A | 8/1997 | Kirsch |
| 5,717,923 A | 2/1998 | Dedrick |
| 5,724,424 A | 3/1998 | Gifford |
| 5,724,521 A | 3/1998 | Dedrick |
| 5,724,524 A | 3/1998 | Hunt et al. |
| 5,748,954 A | 5/1998 | Mauldin |
| 5,752,238 A | 5/1998 | Dedrick |
| 5,768,521 A | 6/1998 | Dedrick |
| 5,794,210 A | 8/1998 | Goldhaber et al. |
| 5,826,241 A | 10/1998 | Stein et al. |
| 5,848,397 A | 12/1998 | Marsh et al. |

(Continued)

FOREIGN PATENT DOCUMENTS

KR  2001-109576  12/2001

(Continued)

OTHER PUBLICATIONS

Murphy et al., Primacy and Recency Effects on Clicking Behavior, Journal of Computer-Mediated Communication (2006), accessed Jan. 25, 2010 at http://jcmc.indiana.edu/vol11/issue2/murphy.html.*

(Continued)

*Primary Examiner*—James Trujillo
*Assistant Examiner*—William Spieler
(74) *Attorney, Agent, or Firm*—Brinks Hofer Gilson & Lione

(57) ABSTRACT

A method and system are disclosed for displaying a search result list in response to a search request from a searcher using a computer network. Ranks in the search result list are auctioned for a search term for a determined display period. A database is maintained to include search listings, where the search listings are associated with a winning bidder for a specified rank in the search result list, the search term and the determined display period. The search result list displayed to the searcher includes search listings ordered in accordance with respective ranks, for the determined display period.

18 Claims, 10 Drawing Sheets

U.S. PATENT DOCUMENTS

| | | | |
|---|---|---|---|
| 5,848,407 | A | 12/1998 | Ishikawa et al. |
| 5,852,820 | A | 12/1998 | Burrows |
| 5,855,008 | A | 12/1998 | Goldhaber et al. |
| 5,864,845 | A | 1/1999 | Voorhees et al. |
| 5,864,846 | A | 1/1999 | Voorhees et al. |
| 5,903,882 | A | 5/1999 | Asay et al. |
| 5,918,014 | A | 6/1999 | Robinson |
| 5,920,854 | A | 7/1999 | Kirsch et al. |
| 5,920,859 | A | 7/1999 | Li |
| 6,078,866 | A | 6/2000 | Buck et al. |
| 6,253,189 | B1 | 6/2001 | Feezell et al. |
| 6,269,361 | B1 | 7/2001 | Davis et al. |
| 6,421,675 | B1 | 7/2002 | Ryan et al. |
| 2002/0004735 | A1 | 1/2002 | Gross |
| 2003/0088508 | A1 | 5/2003 | Fisher et al. |
| 2003/0105677 | A1 | 6/2003 | Skinner |

FOREIGN PATENT DOCUMENTS

| | | |
|---|---|---|
| KR | 2002-9093 | 2/2002 |
| WO | WO 99/20486 | 9/1999 |
| WO | WO 99/48028 | 9/1999 |
| WO | WO 00/16218 | 3/2000 |
| WO | WO 00/16218 A | 3/2000 |
| WO | WO 00/41090 | 7/2000 |

OTHER PUBLICATIONS

WebmasterWorld, SEM Research Topics (2001), accessed Jan. 25, 2010 at http://www.webmasterworld.com/forum34/231.htm.*

International Search Report from corresponding PCT Application No. PCT/US03/26258, 5pp., mailed Feb. 20, 2004.

Supplementary Search Report for corresponding European Patent Application No. EP 00 936393, dated Feb. 20, 2004, 3 pages.

Brin, Sergey et al., "The Anatomy of a Large Scale Hypertextual Web Search Engine", *Computer Networks and ISDN Systems*, North Holland Publishing, Amsterdam, NL, dated Apr. 14, 1998, pp. 1-20.

Doran, David, "Search Engines . . . Their popularity, their secrets, their flaws", *Entrepreneur*, Jul. 1998, p. 18.

Glaser, Ken, "Who Will GoTo.com?", OnlinePress.com, dated Feb. 20, 1998, 2 pages.

Kramer, Ralf et al., "Thesaurus federations: loosely integrated thesauri for document retrieval in networks based on Internet technologies", *Int. J. Digit Libr*, 1997, pp. 122-131.

Sullivan, Danny, "GoTo Sells Positions", *The Search Engine Report*, dated Mar. 3, 1998, 4 pages.

"GoTo.com Announces First Round of Financing, Totaling More Than $6 Million, Led by Draper Fisher Jurvetson", *Business Wire*, dated May 19, 1998, printed from Dialog Gale Group New products, 2 pages.

"New Service Puts Ad Auction, Search Engine Under One Roof", *Electronic Advertising & Marketplace Report*, dated Apr. 28, 1998, vol. 12, Issue 8, 2 pages.

Database of Corporate ResourceNet, "New Service Puts An Auction Search Engine Under One Roof", Electronic Advertising & Marketplace Report, vol. 12, Issue 8, Apr. 1998, p. 6.

Espe, "Online Search Engines Start To Charge For Listings", Washington Business Journal, vol. 18, Issue 1, May 1999, p. 31.

Dawson et al., "2 Search Sites Narrow Their Parameters", Adweek-Western Edition, vol. 48, Issue 42, Oct. 1998, p. 1.

Database of Corporate ResourceNet, "Bits", from Adweek-Eastern Edition, vol. 40, Issue 14, Apr. 1999, p. 46.

Komando, "Searching For Search Engines—from Dogpile to Deja News", Business First-Colombus, vol. 14, Issue 43, Jun. 1998, p. 46.

Database of Corporate ResourceNet, New services Aim to Boost Efficiency of Search Engines, Electronic Advertising & Marketplace Report, vol. 12, Issue 13, Jun. 1998, p. 6.

Database of Corporate ResourceNet, "Goto.com Chooses Quest's SharePlex(R) for Oracle Software to Ensure Uptime for Business-Critical Web Site", PR Newswire, Jun. 2000.

Database of Corporate ResourceNet, "Capitalist Tool", Time Canada, vol. 151, Issue 8. Mar. 1998, p. 41.

Database of DialogClassic(m), :Homestead Technologies' Continued Success Draws $17.50 Million In second Round of Venture Funding, PR Newswire, Apr. 1999.

"APS Search Tools—Patent Search Client Strategy", by US Patent & Trademark Office, Sep. 1997.

"Frequently Asked Questions NT Image Search & Retrieval (IS &R)", by US Patent & Trademark Office, Dec. 1997.

"Chapter 1-Introduction to Dialog", by Dialog Information Service, Inc. pp. 1-1 to 1-14.

"Automated Patent System (APS) Workstation Reference Manual", by US Patent & Trademark Office, Jul. 1996.

Frentzen, Jeff, "Help for Getting the Word Out About Web Sites", PC Week, v14, n46, p. 27(1), Nov. 3, 1997.

Miller, Karen L., "Improve Your Ranking (Building Web Sites to Attract Web Searches)", Home Office Computer, v16, n1, p. 51(2) Jan. 1998.

Wingfiled, "Another Engine Takes Ads By The Click", from http://www.news.com?news/Item/0.4.1387,00/html, May 1996.

Pelline, "New Search Engine Goes Commercial", by CNET News.com, Feb. 1998.

Wang, "Engines Battle Irrelevance of Results-New Search Service Hope To Fill The Void", by Internet World, Feb. 1998.

Vondr Haar, "Searching For The Highest Bidder", from *Inter@active week*.

Riedman, "Search Engine Startup To Auction Listings", from Interactive-Advertising, Feb. 1998.

Rich, "New Search Engine Allows Sites To Pay Their Way to Top", from http://www.adweek.com/iq/iqnews02.asp.

Mardesich, "Web Site Operators Pay for Top Billing-Search Engine Allows Site Sponsors to Buy Place On Special List", from Knight Ridder Newspapers, Mar. 1998.

Hilty, "GoTo.Hell-What Happens When On Line Search Engine Accepts Cash From Web Sites?" from http://www.ocweekly.com/link/archives/97/27/byte-3.11.98-1.html, Mar. 1998.

Flynn, "With GoTo.com's Search Engine, the Highest Bidder Shall Be Ranked First", by the New York Times, Mar. 1998.

Clark, "Start-Up Plans Internet Search Service Tying Results To Advertising Spending", from the Wall Street Journal, Feb. 1998.

"Going, Going . . . ", from a Closer Look of the Wall Street Journal-Marketplace, Apr. 1998.

"Coursey.com", David Coursey's Insider report on Personal Computing, the Internet and Communications, Mar. 1998.

Glaser, "Who Will GoTo.com", from OnlinePress.com, Feb. 1998.

Mardesic, "Search Engine Charges Hit Sites", from http://www.sjmercury.com/business/center/goti022198.html, Feb. 1998.

"News Watch About Search Engines", from http://searchenginewatch.com/ness.html, Feb. 1998.

Wang, "Engines Battle Irrelevance of Results", from Internet World.

Swartz, "Browser Only Lists Paying Web Sites Critics Fear Approach Will Squeeze Out Most Small Internet Players", from http://www.sfgate.com/cgi-bin/ publish on San Francisco Chronicle, Feb. 1998.

McWilliams, PC World Online, Feb. 23, 1998, "Search Engine To Sell Top Positions On Results Lists", from http://www.pcworld.com/news/daily/data/ 0298/....html.

"Search Engine Start Up to Auction Listings", from http://www.adage.com/interactive/daily/index/html, Feb. 1998.

Alyson, "Searching The Search Engines", from Bacon's, May 1998.

Pelline, "Pay-for-placement gets another shot", from http://www.newscom.?news/item/0,4,19307,00.html, Sep. 1997.

IBM Technical Disclosure Bulletin, "Organizing A Ranked List of Search Matches", Nov. 1994.

Jeffrey Brewer, ClickZ Today, Aug. 18, 1998, "Pay-For-Performance: Creating More And Better Value", obtained at the internet address http://www.clickz.com, Aug. 18, 1998.

Jesse Berst, ZDNet, Aug. 17, 1998, "Search Sites' Shocking Secret", obtained at the internet address http://www.zdnet.com/anchordesk/story/story_2432.html, Aug. 17, 1998.

Sara Fisher, "Budding Internet Firm Finds Niche in Satisfaction", L.A. Business Journal, Aug. 10, 1998.

"Disclosure Rules", The Industry Standard—The Newsmagazine of the Internet Economy, Aug. 10, 1998.

G. David Doran, "Pay to Play", Entrepreneur, Jul. 1998, p. 18.

Advertising Age-Interactive Daily Homepage; obtained at the internet address http://www.adage.com/interactive/daily/index.html, Jun. 8, 1998.
Kim Komando, "With About 320 Million Sites, Search Engines Offer Some Help", copyright 1998, Los Angeles Times Syndication.
Margot Williams, "How to Ease Your Online Searches", Lansing State Journal, Jun. 1, 1998.
"GoTo.com Gets Venture Funding", Internet World Magazine, Jun. 1, 1998.
Sasha Alyson, "Searching The Search Engines", Front Page, May 8, 1998.
Advertising Age-Interactive Daily Homepage, Feb. 23, 1998, "Search Engine Startup To Auction Listings", obtained at the internet address http://www.adage.com/interactive/mdaily/index.html.
Brian McWilliams, PC World Online, Feb. 23, 1998, "Search Engine to Sell Top Positions On Results Lists", obtained at the internet address http://www.pcworld.com/news/daily/data/0298/9880223173204.html.
Jon Swartz, San Francisco Chronicle, Feb. 23, 1998, "Browser Only Lists Paying Web Sites Critics Fear Approach Will Squeeze Out Most Small Internet Players", obtained at the internet address http://www.sfgate.com/cgi-bin/arti...le/archive/1998/02/21/BU102470.DTL.
Nelson Wang, "Engines Battle Irrelevance of Results", from http://www.internetworld,com/print/current/news/19980223-battle.html, Feb. 1998.
Search Engine Watch, Feb. 21, 1998, "GoTo Sells Positions", obtained at the internet address http://www.searchenginewatch.com/news.html, Feb. 23, 1998.
Jodi Mardesich, "Search Engine Charges Hit Sites", from http://wwww.sjmercury.com/businrss/center/goto022198.html, Feb. 1998.
Ken Glaser, Who Will GoTo.com?, OnlinePress.com, Feb. 1998.
Jeff Pelline, "New Search Engine Goes Commercial", from http://www.news.com/News/Item/0,4,19281,00.html, Feb. 20, 1998.
"Going, Going . . . ", The Wall Street Journal, Apr. 1998. p. B1.
David Coursey, "Coursey.com", Mar. 1998.
Don Clark, "Start-Up Plans Internet Search Service Tying Results To Advertising Spending", The Wall Street Journal, Feb. 20, 1998.
Laurie J. Flynn, "With GoTo.com's Search Engine, The Highest Bidder Shall Be Ranked First", The New York Times, Mar. 1998, p. C1.
Wyn Hilty, OCWeekly byte marks, "GoTo.Hell", from http://www.ocweekly.com/ink/archives/97/27byte-3.11.98-1.shtml, Mar. 13, 1998.
Jodi Mardesich, "Web Site Operators Pay For Top Billing", The News—Herald (Willoughby, OH), Mar. 2, 1998.
Laura Rich, Adweek Online IQ News Online, Feb. 23, 1998, "New Search Engine Allows Sites to Pay Their Way to Top", from http://www.adweek.com/iq/ ignews02.asp, Feb. 1998.
Patricia Riedman, "Search Engine Startup To Auction Listings", Advertising Age Magazine, Feb. 23, 1998, p. 34.
Steven Vonder Haar, ZDNet,com, Feb. 19, 1998, "Searching For The Highest Bidder", obtained at the internet address http://www.zdnet.com/intweek/daily/980219i.html, Feb. 23, 1998.
Nelson Wang, "Engines Battle Irrelevance of Results", Internet World, Feb. 10, 1998, p. 1.
Interactive Week Magazine, Garden City, N.Y. May 25, 1998.
Jeff Pelline, "New Search Engine Goes Commerical", CNET News.com, from http://www.news.com/News/Item/0,4,19281,00.html, Feb. 20, 1998.
Nick Wingfield, Staff Writer, CNET News.com, Jun. 21, 1996, "Engine Sells Results, Draws Fire", obtained at the internet address http://www.news.com/News/Item/Textonly/0,25,1635,00. html, Jul. 29, 1999.
Nick Wingfield, Staff Writer, CNET News.com, May 22, 1996, "Another Engine Takes Ads By The Click", obtained at the internet address http://www.news.com/News/Item/0,4,1387,00.html, Jul. 29, 1999.
Rose Aguilar, Staff Writer, CNET News.com, Apr. 29, 1996, "New Ad Model Charges By The Click", obtained at the internet address http://www.news.com/News/Item/0,4,1199,00.html, Jul. 29, 1999.
Alex Lash, Staff Writer, CNET News.com, Dec. 11, 1996, "Open Text Updates Tools", obtained at the internet address http://www.news.com/News/Item/0,4,6118,00.html, Jul. 29, 1999.
"About SearchUP, Inc.", Jul. 15, 1999, obtained at the internet address http://www.searchup.com/about.cfm.
"Testimonials"., Jul. 15, 1999, obtained at the internet address http://www.searchup.com/testimonials.cfm.
"Benefits", Jul. 15, 1999, obtained at the internet address http://www.searchup.com/benefits.cfm.
"Information", Jul. 15, 1999, obtained at the internet address http://www.searchup.com/information.cfm.
"Tips & Tricks", Jul. 15, 1999, obtained at the internet address http://www.searchup.com/tipsandtricks.cfm.
Correspondence from Bryan Buck, President of SearchUp.com, Jul. 7, 1999.
Saul Hansell "Alta Vista Invites Advertisers to Pay for Top Ranking", The New York Times, Apr. 15, 1999, p. C2.
Galore—Super Search Engine, May 21, 1999, obtained at the internet address http://www.galore.com/1/mainframe.shtml.
hitsgalore.com Search Engine, May 21, 1999, obtained at the internet address http://www.hitsgalore.com.
I Seek It "The Next Generation Search Engine", May 21, 1999, obtained at the internet address http://www.iseekit.com.
Correspondence from Emilia F. Cannella to Robert Brahms, CEO of BeFirst Internet Corporation regarding findwhat.com, Jul. 20, 1999.
Correspondence from Emilia F. Cannella to Michael Melcher, MC Services regarding SearchUP.com, Jul. 1, 1999.
Correspondence from Emilia F. Cannella to Robert G. Schuler, Esq., Kegler, Brown, Hill & Ritter regarding iseekit.com, Jul. 1, 1999.
Correspondence from Emilia F. Cannella to Andrew Conru, Vote Publishing regarding galore.com, Jun. 30, 1999.
SearchUP.com—Internet Directory, Automated Bid Placement System, obtained at the internet address http://www.searchup.com/search.cfm, Aug. 25, 1999.
SearchUP: URL Position Manager, obtained at the internet address https://www.securearea.net/searchup/login.cfm, Aug. 25, 1999.
SearchUP: URL Position Manager, obtained at the internet address https://www.securearea.net/searchup/newaccount.cfm, Aug. 25, 1999.
SearchUP: URL Position Manager, obtained at the internet address https://www.securearea.net/getaccount/login.cfm, Aug. 25, 1999.
Correspondence from Emilia F. Cannella to Mr. D. Reed, Reports Galore, regarding hitsgalore.com, Jun. 30, 1999.
Miller, Karen L., "Improve Your Ranking", Home Office Computer, vol. 16, No. 1, Jan. 1998, p. 51(2).
Jeff Fretzen, "Help For Getting The Word Out About Web Sites", PC Week, Vo. 14, No. 46, Nov. 3, 1997, p. 27(1).
Article from the Search Engine Report, "GoTo to Sell Positions", Mar. 3, 1998, http://www.searchenginewatch.com/sereport/9803-to-to-html.
Article from CNET News, "Engine Sells Results, Draws Fire", Jun. 21, 1996, http://www.nees.com/News?Item/0,4,1635,00.html.
Press release on Lightweight Directory Access protocol (LDAP), Netscape Comm. Corp. Mountain View, CA., Apr. 1996.
ClickMail Central directory, circa Apr. 1996.
GoTo.com, circa 1998, at www.goto.com.
Northern Light, circa 1997-98, at sirocco.northernlight.com.
Laura Rich, Adweek Online IQ News Online, Feb. 23, 1998, "New Search Engine Allows Sites to Pay Their Way to Top", from http://www.adweek.com/iq/ iqnews02.asp, Feb. 23, 1998.
Smith, Laura B., article "Going . . . Gone", PC Week, vol. 13, No. 34, Aug. 26, 1996, p. E1 (2), http://www.dialog-classic.com/DialogClassic/dialog.
Cliff Kurtzman, "Another Internet Advertising List", Internet Advertising Digest #006, dated Jun. 19, 1996, from http://www.o-a.com/archive/1996/june.0021.html, printed Sep. 28, 2001, 5 pages.
Press Release article titled "GoTo.com Announces First round of Financing, Totaling More Than $6 Million, Led by Draper, Fisher Jurvetson", *Business Wire*, dated May 19, 1998, printed from the Internet at <http://www.dialogclassic.com/main.vingw> Nov. 9, 2000, 2 pages.
Ubois, Jeff, article titled "He who pays the piper . . . ", *MIDRANGE Systems*, vol. 9, No. 12, 1996, p. 50 (1), reprinted by Cardinal Business Media, Inc.

* cited by examiner

INVENTORY DATABASE

INVENTORY TABLE

AUCTION DATABASE

BID TABLE

SYSTEM AND METHOD FOR CONDUCTING AN AUCTION-BASED RANKING OF SEARCH RESULTS ON A COMPUTER NETWORK

CROSS-REFERENCE TO RELATED APPLICATIONS

The present application is a Continuation application of U.S. patent application Ser. No. 10/226,103, filed Aug. 22, 2002, which is incorporated by reference herein.

BACKGROUND

The transfer of information over computer networks is an important way by which institutions, corporations, and individuals conduct business. Computer networks have grown over the years from independent and isolated entities established to serve the needs of a single group into vast internets that interconnect disparate physical networks and allow them to function as a coordinated system. Currently, the largest computer network is the Internet, a worldwide interconnection of computer networks that communicate using a common protocol.

The Internet has transformed into a global marketplace of goods and services, driven in large part by the introduction of the World Wide Web ("the web"), an information system. Computers connected to the Internet may access web pages via a browser program, which has a powerful, simple-to-learn graphical user interface. In a web-based search on an Internet search engine, a user enters a search term of one or more keywords, which the search engine then uses to generate a listing of web pages that the user may access via a hyperlink. The search engines often generate irrelevant search results. The search results may be generated by mechanisms that often rely on blind mathematical formulas and may be random.

Internet network information providers should be able to control their placement in search result listings so that their listings are prominent in searches that are relevant to the content of their web site. The search engine functionality of the Internet should be focused to facilitate an on-line marketplace that offers searchers quick, easy and relevant search results while providing Internet network information providers with a cost-effective way to target consumers. A consumer utilizing a search engine that facilitates this on-line marketplace finds companies or businesses that offer the products, services, or information that the searcher is seeking. In the on-line marketplace, companies providing products, services, or information bid in an open auction-based ranking environment for ranks on a search result list generated by an Internet search engine.

Under some known auction-based search engines, a network information provider's rank in a search result list can change continuously since other network information providers may bid on a new rank at any time. The continuously changing ranks in a search result list can cause uncertainty for a network information provider, including uncertainty in the number of user visits that will result, and uncertainty in the total cost for the network information provider.

Moreover, operators of some known auction-based search engines may be losing potential revenue. Operators of such search engines typically get paid based, at least in part, on the amount bid for a rank on the list and the number of times searchers select the advertisement by clicking through to the network information provider. For example, the searcher clicks through by clicking on the advertisement in the search result list with a mouse. As a result, the operator of the search engine monitors the click throughs to the network information provider. Constant monitoring expends the operator's resources and time and may lower the operator's revenue. The operator may also wish to monitor click throughs to ensure that the network information provider is not charged for fraudulent clicks. Checking for fraudulent clicks may also expend the operator's time and resources. Moreover, known systems may allow for collusive agreements among network information providers to keep bid amounts low and thus lower the income of the operator.

Thus, there is a need for an alternative system and method for an auction-based ranking of search results on a computer network.

BRIEF SUMMARY

According to the embodiments, network information providers can obtain a search result rank for a determined amount of time, without having to continuously monitor bidding. The network information provider may also obtain a certain search result rank on the list at a determined time in the future. Such a system allows for more control over the network information provider's costs, since the network information provider can determine in advance the cost and duration of a rank of a search listing in the search result list.

Described is a system and method for displaying a search result list in response to a search request from a searcher using a computer network. Ranks in the search result list are auctioned for a search term for a determined display period. A database is maintained to include search listings, where the search listings are associated with a winning bidder for a specified rank in the search result list, the search term and the determined display period. The search result list displayed to the searcher includes search listings ordered in accordance with respective ranks, for the determined display period.

DETAILED DESCRIPTION

According to one embodiment, the system and method allows for network information providers to bid for ranks to place a listing in a search result list. The search result list is posted on a network, for example, the Web. Network information providers include entities that sell goods or services, for example, advertisers, and other entities, for example, libraries. The listing includes contact or other information of the network information provider. The network information provider bids to display the listing for a determined display period. One or more items to list are submitted to the operator of a search site. Other submitted information includes search terms, for example relating to the item, a title, a description of the item and a URL of the network information provider.

The search result list can be the result of any system in which a list of items or entries is displayed corresponding to an identified search term. A user initiated "search" per se need not occur. Typically, the higher the listing occurs in the search result list, the more exposure the network information provider will obtain. The listing may then appear in a list of search results that occurred in response to a query of a user of the auction-based search site, for example, a searcher or consumer. The operator of the search engine can review the listing before the listing is posted.

The following description is presented to enable any person skilled in the art to make and use the invention. For purposes of explanation, specific nomenclature is set forth to provide a thorough understanding of the present invention. Descriptions of specific applications are provided only as examples. Various modifications to the embodiments will be readily apparent to those skilled in the art, and the general principles defined herein may be applied to other embodiments and applications without departing from the spirit and scope of the invention. Thus, the invention is not intended to be limited to the embodiments shown, but is to be accorded the widest scope consistent with the principles and features disclosed herein. Commonly assigned U.S. Pat. No. 6,269,361, to Davis et al., entitled "System and Method for Influencing a Position on a Search Result List Generated by a Computer Network Search Engine" is incorporated by reference herein, as an example of a system in which the present invention can be used.

Figure 1:
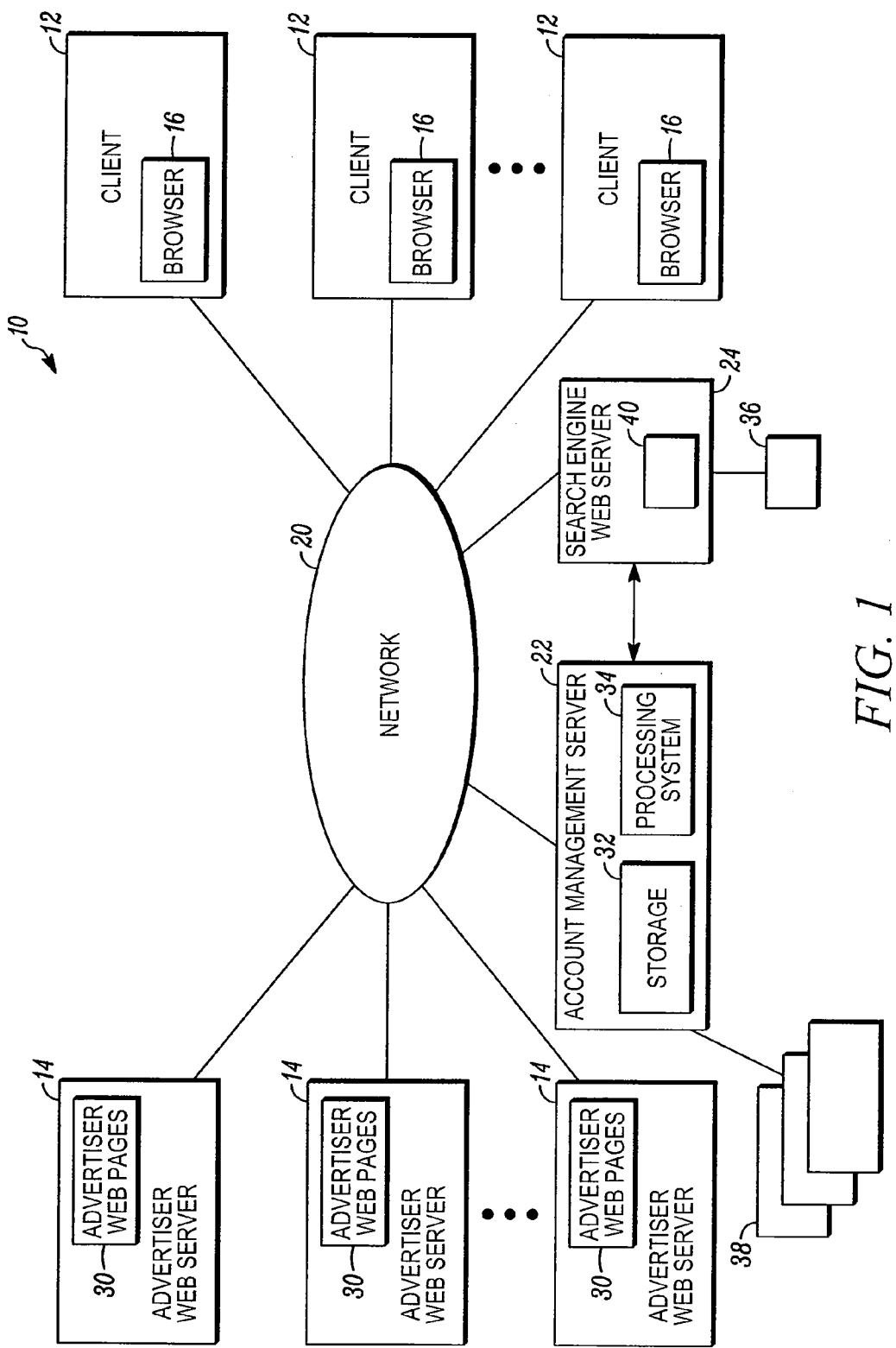
FIG. 1 is a block diagram illustrating the relationship between a network and one embodiment of the present system and method.

FIG. 1 is a block diagram of an example of a distributed system 10 configured as client/server architecture used in one embodiment. A "client" is a member of a class or group that uses the services of another class or group to which it is not related. In the context of a computer network, such as the Internet, a client is a process (i.e. roughly a program or task) that requests a service that is provided by another process, known as a server program. The client process uses the requested service without having to know any working details about the other server program or the server itself. In networked systems, a client process usually runs on a computer that accesses shared network resources provided by another computer running a corresponding server process. However, it should also be noted that it is possible for the client process and the server process to run on the same computer.

A "server" is typically a remote computer system that is accessible over a communications medium such as the Internet. The client process may be active in a second computer system, and communicate with the server process over a communications medium that allows multiple clients to take advantage of the information-gathering capabilities of the server. Thus, the server essentially acts as an information provider for a computer network.

The block diagram of FIG. 1 therefore shows a distributed system 10 including a plurality of client computers 12, a plurality of network information provider web servers 14, an account management server 22, and a search engine web server 24, all of which are connected to a network 20. The network 20 will be hereinafter generally referred to as the Internet. Although the system and method is specifically useful for the Internet, it should be understood that the client computers 12, network information provider web servers 14, account management server 22, and search engine web server 24 may be connected together through one of a number of different types of networks. Such networks may include local area networks (LANs), other wide area networks (WANs), wireless networks, and regional networks accessed over telephone lines, such as commercial information services. The client and server processes may even include different programs executing simultaneously on a single computer.

The client computers 12 can be conventional personal computers (PCs), workstations, or computer systems of any other size. Each client 12 typically includes one or more processors, memories, input/output devices, and a network interface, such as a conventional modem or an Ethernet interface. The network information provider web servers 14, account management server 22, and the search engine web server 24 can be similarly configured. However, network information provider web servers 14, account management server 22, and search engine web server 24 may each include many computers connected by a separate private network. The network 20 may include hundreds of thousands of individual networks of computers.

A searcher or other user can use a client computer 12 to execute web browser programs 16, such as the NAVIGATOR or EXPLORER browser programs. The web browser can be used to locate the web pages or records 30 stored on network information provider server 14. The browser programs 16 allow the users to enter addresses of specific web pages 30 to be retrieved, such as Uniform Resource Locators, or URLs. In addition, once a page has been retrieved, the browser programs 16 can provide access to other pages or records when the user clicks on hyperlinks to other web pages. Such hyperlinks are located within the web pages 30 and provide an automated way for the user to enter the URL of another page and to retrieve that page. The pages can be data records including as content plain textual information, or more complex digitally encoded multimedia content, such as software programs, graphics, audio signals and videos.

In one embodiment, shown in FIG. 1, client computers 12 communicate through the network 20 with various network information providers, including account management server 22, search engine server 24, and network information provider servers 14 using the functionality provided by a HyperText Transfer Protocol (HTTP). Although other communications protocols, such as FTP, SNMP, TELNET, and a number of other protocols known in the art, may be used. Preferably, search engine server 24, account management server 22, and network information provider servers 14 are accessable on the World Wide Web.

The distributed system 10 includes an account management server 22. The account management server 22 includes computer storage medium 32 and a processing system 34. A database 38 is stored on the storage medium 32 of the account management server 22. The database 38 contains information regarding the network information provider. It will be appreciated from the description below that the system and method may be implemented in software that is stored as executable instructions on a computer storage medium, such as memories or mass storage devices, on the account management server 22. Conventional browser programs 16, running on client computers 12, may be used to access network information provider account information stored on account management server 22. Preferably, access to the account management server 22 is accomplished through a firewall, not shown, which protects the account management and search result placement programs and the account information from external tampering. Additional security may be provided via enhancements to the standard communications protocols such as Secure HTTP or the Secure Sockets Layer.

The distributed system 10 also includes a search engine web server 24. A search engine program permits network users, upon navigating to the search engine web server URL or sites on other web servers capable of submitting queries to the search engine web server 24 through their browser program 16, to type keyword queries to identify pages of interest among the millions of pages available on the World Wide Web.

In one embodiment, the search engine web server 24 generates a search result list that includes, at least in part, relevant entries obtained from and formatted by the results of the bidding process conducted by the account management server 22. The search engine web server 24 generates a list of hypertext links to documents that contain information relevant to search terms entered by the user at the client computer 12. The search engine web server may generate the search result list substantially in real time in response to the search request from the searcher. The search engine web server transmits this list, in the form of a web page, to the network user, where it is displayed on the browser 16 running on the client computer 12. The search result list web page, an example of which is presented in FIG. 2, will be discussed below in further detail.

Search engine web server 24 is connected to the Internet 20. In one embodiment, search engine web server 24 includes a search database 40 including search listing records used to generate search results in response to user queries. In addition, search engine web server 24 may also be connected to the account management server 22. Account management server 22 may also be connected to the Internet. The search engine web server 24 and the account management server 22 address the different information needs of the users located at client computers 12.

For example, one class of users located at client computers 12 may be network information providers such as advertising web site promoters or owners having network information provider web pages 30 located on network information provider web servers 14. These web site promoters, such as advertisers, may wish to access account information residing in storage 32 on account management server 22. A network information provider may participate in a competitive bidding process with other network information providers. A network information provider may bid on any number of search terms relevant to the content of the network information provider's web site. In one embodiment, the relevance of a bid search term to a network information provider's web site is determined through a manual editorial process prior to insertion of the search listing containing the search term and network information provider web site URL into the database 40. In an alternate embodiment, the relevance of a bid search term in a search listing to the corresponding web site may be evaluated using a computer program executing at processor 34 of account management server 22, where the computer program will evaluate the search term and corresponding web site according to a set of defined editorial rules.

Another class of users at client computers 12 may include searchers seeking specific information on the web. The searchers may access, through their browsers 16, a search engine web page 36 residing on web server 24. The search engine web page 36 includes a query box in which a searcher may type a search term having one or more keywords. Alternatively, the searcher may query the search engine web server 24 through a query box hyperlinked to the search engine web server 24 and located on a web page stored at a remote web server. When the searcher has finished entering the search term, the searcher may transmit the query to the search engine web server 24 by clicking on a provided hyperlink. The search engine web server 24 may then generate a search result list page and transmit this page to the searcher at the client computer 12.

The searcher may also submit a query to a third-party web server such as a portal, examples of which may be found at http://www.yahoo.com/ and http://www.msn.com. In response to the query, the portal web server forwards the query to search engine web server 24, and formats and incorporates the response in the web page that the portal provides to the searcher.

The searcher may click on the hypertext links associated with each listing on the search results page to access the corresponding web pages. The hypertext links may access web pages anywhere on the Internet, and include paid listings to network information provider web pages 18 located on network information provider web servers 14. In one embodiment, the search result list also includes non-paid listings that are not placed as a result of network information provider bids and are generated by a conventional World Wide Web search engine, such as the INKTOMI, LYCOS, or YAHOO! search engines. The non-paid hypertext links may also include links manually indexed into the database 40 by an editorial team.

Figure 2:
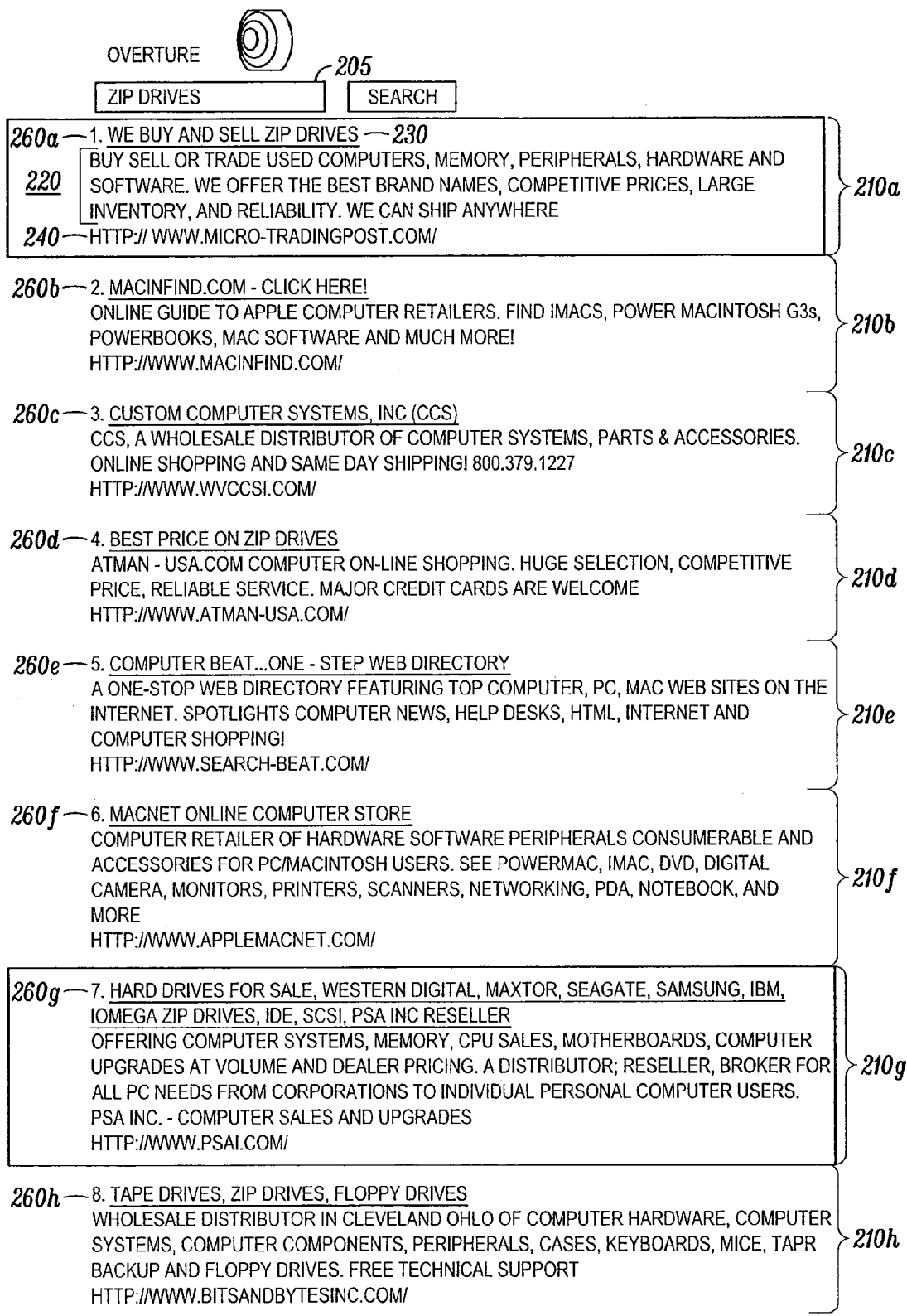
FIG. 2 illustrates an example of a search result list generated according to one embodiment.

An example of a search result list display used in one embodiment is shown in FIG. 2, which is a display of the first several entries resulting from a search for the term 205 "zip drives". When a searcher accesses the search query page on the search engine web server 24 and executes a search request according to the procedure described previously, the search engine web server 24 preferably generates and displays a search result list where the "canonicalized" entry in search term field of each search listing in the search result list exactly matches the canonicalized search term query entered by the remote searcher. The canonicalization of search terms used in queries and search listings removes common irregularities of search terms entered by searches and web site promoters, such as capital letters and pluralizations, in order to generate relevant results.

However, alternate schemes could be used for determining a match between the search term field of the search listing and the search term query entered by the remote searcher. For example, string matching algorithms known in the art may be employed to generate matches where the keywords of the search listing search term and the search term query have the same root but are not exactly the same (e.g., computing vs. computer). Alternatively a thesaurus database of synonyms may be stored at search engine web server 24, so that matches may be generated for a search term having synonyms. Localization methodologies may also be employed to refine certain searches. For example, a search for "bakery" or "grocery store" may be limited to those network information providers within a selected city, zip code, or telephone area code. This information may be obtained through a cross-reference of the network information provider account database stored at storage 32 on account management server 22. Finally, internationalization methodologies may be employed to refine searches for users outside the United States. For example, country or language-specific search results may be generated, by a cross-reference of the network information provider account database, for example.

As shown in FIG. 2, a single entry, such as entry 210*a* in a search result list consists of a description 220 of the web site, preferably including a title and a short textual description, and a hyperlink 230 which, when clicked by a searcher, directs the searcher's browser to the URL where the described web site is located. The URL 240 may also be displayed in the search result list entry 210a, as shown in FIG. 2. Alternately the host name part of the URL may be displayed in the search result list entry 210a, as shown in FIG. 2.

Search result list entries 210a-210h may also show the rank of the network information provider's search listing. The rank is an ordinal value, preferably a number, generated and assigned to the search listing by the processing system 34 of FIG. 1. Preferably, the network information provider's search listing is listed as described below. In general, network information providers bid for a rank in the search result list for a search term for a determined display period. The search listings are associated with the search term, the network information provider that won for a specified rank and a determined display period. The search result list is displayed to the searcher according to the search term, the winning bidder for the specified rank and the determined display period.

Unpaid listings 210g and 210h may be displayed if there are no winning bids for listings at the corresponding ranks to fill the slots in a search results page. Unpaid listings may be written by human editors, or may be generated by a search engine utilizing objective distributed database and text searching algorithms known in the art. An example of such a search engine is operated by Inktomi Corporation. The original search query entered by the remote searcher is used to generate unpaid listings through the conventional search engine. Additional unpaid listings may be displayed following the lowest-ranked paid listing.

Figure 3:
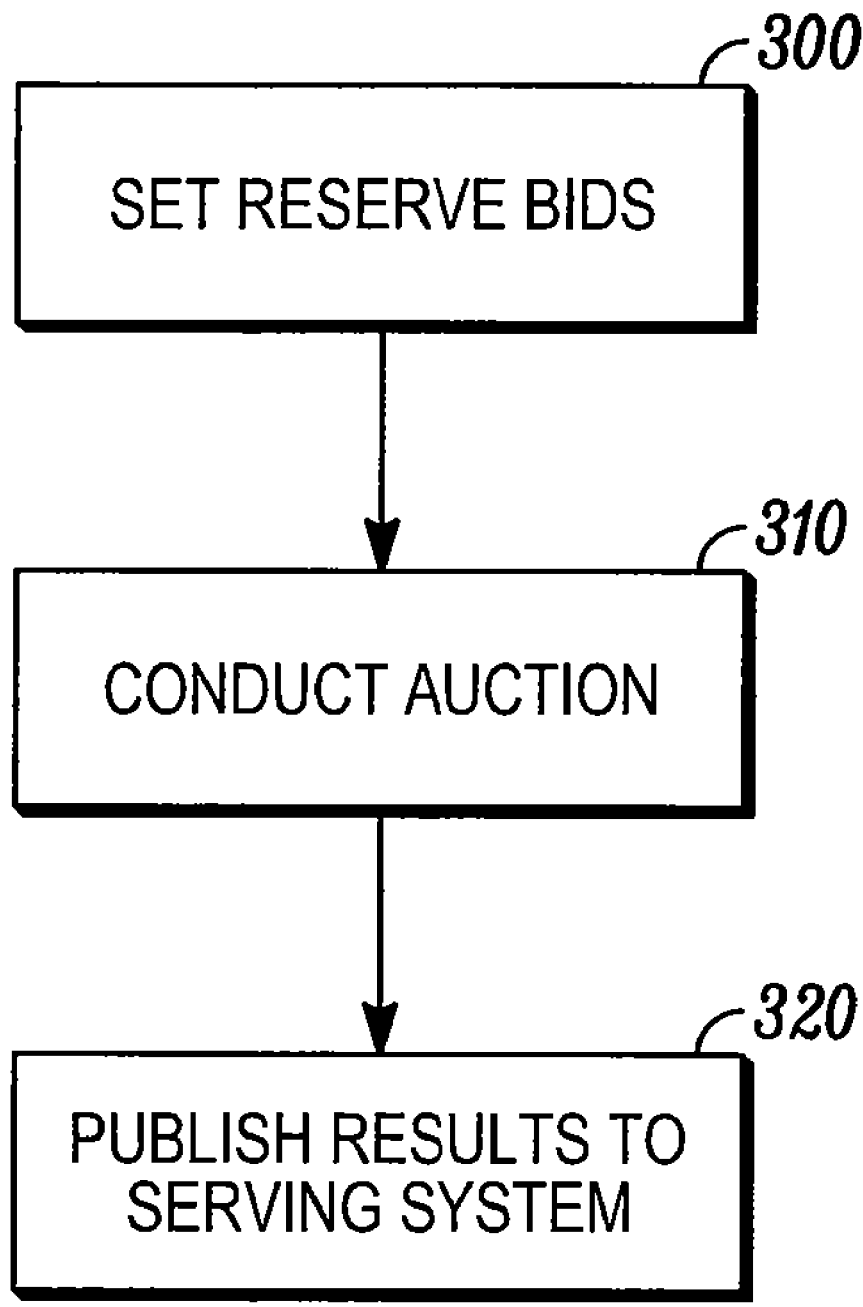
FIG. 3 is a flow diagram that generally illustrates one process to collect information to be displayed to a searcher.

FIG. 3 is a block diagram that generally illustrates a way to collect information to be displayed to a searcher. At block 300, reserve bids are set for a particular rank 260a-h and a particular search term 205, and for a determined time period. The time period includes a start time and a specified duration. The specified duration can include, for example, a day, a week, a month, or other specified time periods. The duration can be broken down into smaller or larger time periods, for example an hour or a determined accounting period of a network information provider. At block 310, the auction is conducted to determine the winning network information provider for a specified search term 205 at a specified rank 260a-h and for the determined time period. One embodiment of the auction-based ranking is described below.

At block 320, after the auction is conducted the results of the auction are stored, for example, at the account management server 22. As a searcher searches for a specified search term 205, the account management server 22 manages how search result entries 210a-h are displayed to the searcher. The account management server 22 determines which search result entries 210a-h populate the ranks 260a-h according to the winning network information providers for the particular ranks and for the time that the search result entries 210a-h are displayed.

Figure 4:
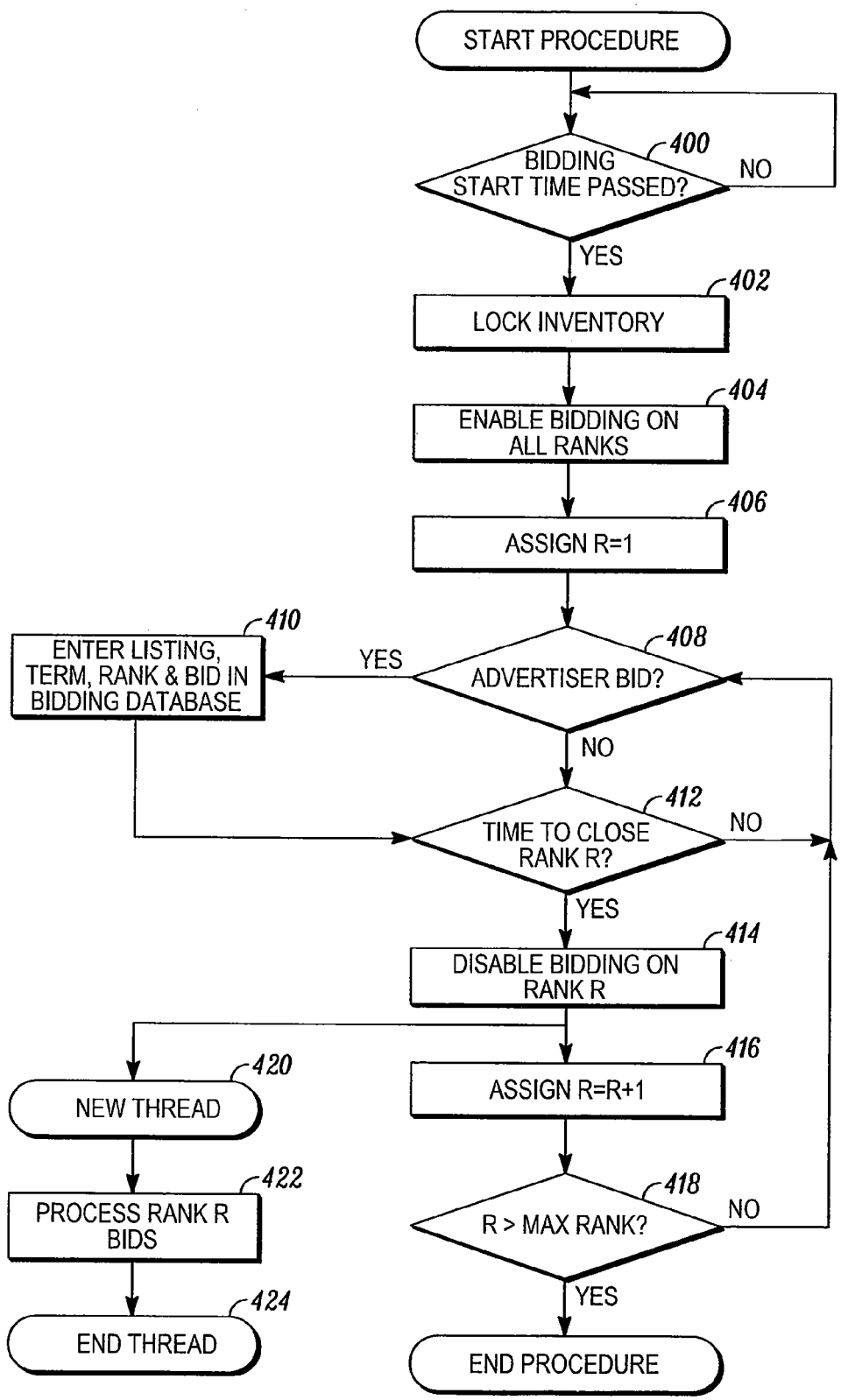
FIG. 4 is a flow diagram illustrating one process to conduct an auction-based search according to one embodiment.

FIG. 4 is a block diagram illustrating a way to conduct auction-based ranking according to one embodiment. While, in the example, ranks are auctioned consecutively, the ranks could also be auctioned in other ways. For example, continuous bidding can occur for all ranks up to the close of the auction, after which winners, if any, are determined for each rank. The winner of the rank can be determined based solely on a winning bid amount, or based on the winning bid amount and other factors, such as a number of visitors to network information provider's web site. The number of visitors can be determined based on an amount of click throughs to the network information provider's web site for a determined time period.

A start time is established for bidding to occur for ranks 260a-h of a particular search term 205 for a determined time period. At block 400, a determination is made whether the start time for bidding has occurred. At block 402, when the start time for bidding has occurred, an inventory of available ranks 260a-h on which to bid is locked for the currently available ranks 260a-h. At block 404, bidding is enabled for all available ranks 260a-h. Bidding for the ranks 260a-h may close at the same time or may be staggered to allow network information providers to increase bids for lower ranks if they lost the auction-based ranking for the higher rank, or vice versa. In addition, the order of auctioning off the ranks 260a-h can be varied, for example, by first auctioning off the lowest rank or by randomly auctioning ranks. A sealed bid or open bid format can be used, but preferably a sealed bid is used. A sealed-bid format may avoid creating frenzy around closing time as network information providers vie to bid on potentially tens of thousands of search terms.

At block 406, if the bidding is accomplished sequentially, the first rank 260a-h to auction is assigned. The first rank to auction could be the highest rank, for example, Rank 1 260a, the lowest rank to be auctioned, or any rank in between. For purposes of explanation, the first rank to be auctioned in one embodiment is Rank 1 260a. At block 408, the network information provider places a bid.

The network information provider bidding may take many forms. One form of bidding is a sealed-bid second-price auction, but other auction formats can be used. Other auction-based ranking mechanisms which may be employed include sealed-bid first price auctions, open outcry auctions, and various forms of combinatorial auctions that allow bidders to assign bids to combinations of items, e.g. combinations of search terms. Auction-based rankings may optionally employ reserve prices, which may or may not be revealed before bidding is closed. According to a sealed-bid second price auction the highest bidder wins the bidding and pays the amount of the second highest bid. In a sealed-bid first price auction the highest bidder pays his bid amount. An open outcry allows the network information providers to see during the bidding process the bids that have been entered. An auction with a reserve price means that a rank will not be awarded unless a minimum bid amount is met or exceeded.

At block 410, during the bidding interval, network information providers can enter listing terms, ranks and bid amounts, which can be stored and processed by the account management server 22. At block 412, network information providers can bid on the rank until the close of bidding. At block 414, bidding for the rank is disabled when the bidding closes. The bids for the ranks 260a-h may be accomplished sequentially, for example, by not opening bids for a Rank until bidding for the previous rank closes. At block 416, if the bids are accomplished sequentially, the rank to bid on is increased by one after the bidding closes for the previous rank. At block 418, the bidding continues in this manner until bidding for all of the ranks 260a-h closes.

The following example can be used to illustrate one embodiment of the bidding process. The top-ranked (or #1) spot in the results may be auctioned for the search term "car." The network information providers may bid to obtain the top-ranked spot for a determined duration, for example, all of tomorrow. The determined duration can include, for example, from midnight of one day to midnight of the following day. It can also be determined that the auction-based ranking closes at 1:00 pm Pacific time the day before the auctioned rank is to be displayed. Bidders submit bids preferably via an on-line bidding system, for example using the distributed system 10, but telephone or other means can be used to communicate the bids. At 1:00 pm Pacific time the bidding closes for Rank 1 for "car". The listing corresponding to the winner of the auction-based ranking is entered in a list at Rank 1 for tomorrow's search results for "car", with a cost to the network information provider equal to the second highest bid for Rank 1.

If the winning network information provider had any bids on less-prominent, for example lower, ranks for the search term, those bids may be removed from consideration in determining the other winners and prices, as described below. The winner for Rank 1 of "car" is then visible to all bidders, but the cost to the winner may or may not be published to the other bidders. At 1:10 pm Pacific time the bidding may close on Rank 2 for "car", giving time for network information providers who lost the bidding for Rank 1 to increase their bids for Rank 2 and lower ranks if they wish. The winner of Rank 2 is determined after the bidding closes for Rank 2. If the bidding for any of the ranks does not meet the reserve price set for that term and rank, the rank that did not meet the reserve price may be occupied by an editorially-selected or algorithmically-selected listing. The auction-based ranking proceeds until the winners (if any) for all the term and rank combinations up for auction have been determined.

Preferably a bid includes a money (or money equivalent) amount. As used herein, the money amount can include any suitable meaning. In one embodiment, the money amount can be in accordance with a set amount, a cost-per-click through, or a cost-per-impression, or any combination thereof. The money amount can also be combined with other factors. Preferably, a database, such as storage 32, is used to maintain information about the network information provider, including the network information provider's billing and bidding information.

Figure 5:
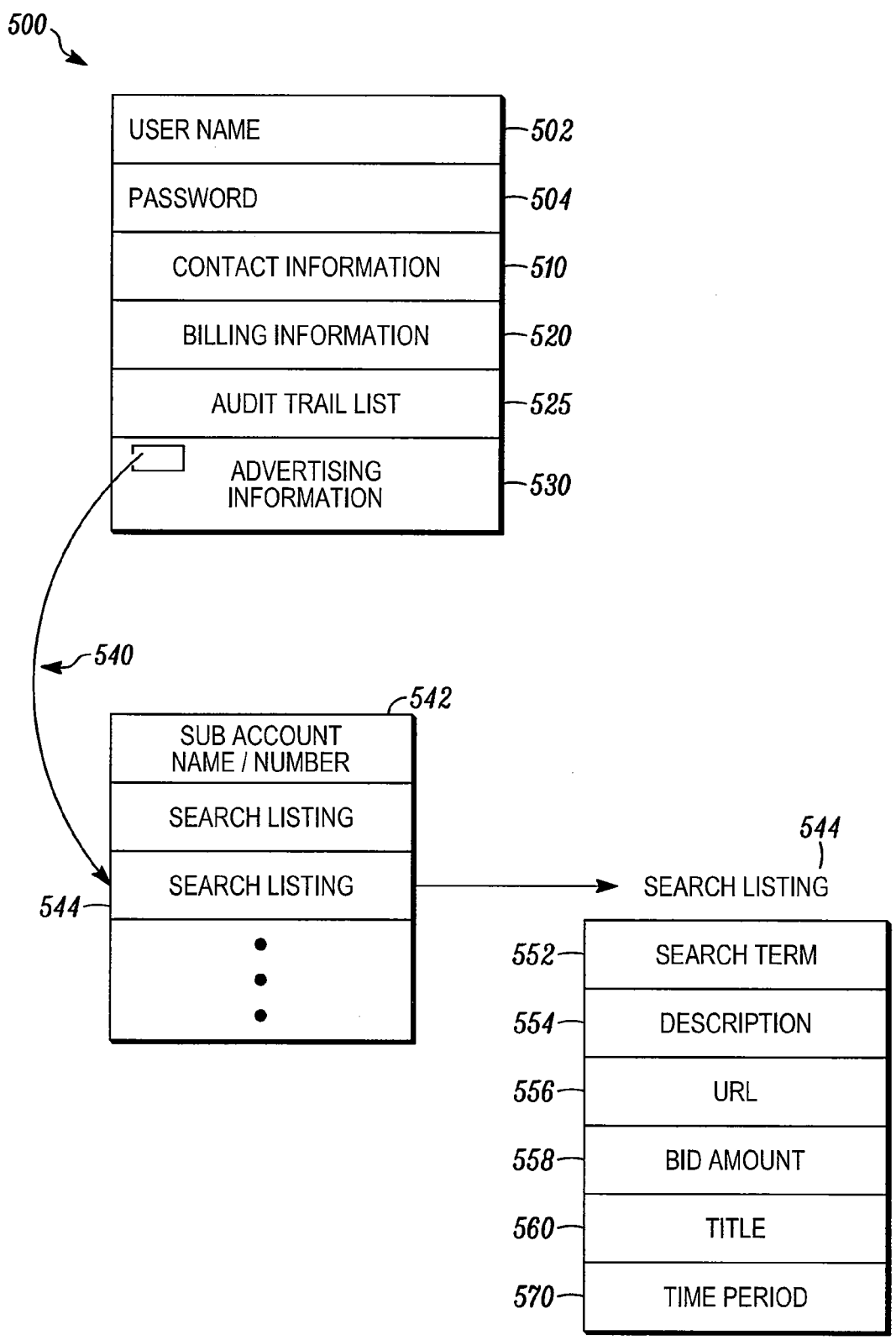
FIG. 5 is a diagram showing exemplary types of information contained in a network information provider account record.

FIG. 5 is a diagram showing an exemplary type of information contained in a network information provider account record 500 in the database. First, a network information provider account record 500 contains a username 502 and a password 504, used, for example, for online authentication. The account record typically also contains contact information 510 (e.g., contact name, company name, street address, phone, e-mail address).

Contact information 510 is preferably used to direct communications to the network information provider when the network information provider has requested notification of events under the notification option, discussed below. The account record 500 also contains billing information 520 (e.g., current balance and credit card information). The billing information 520 contains data accessed when the network information provider selects the option to add money to its account. In addition, certain billing information, such as the current balance, may trigger events requiring notification via the notification option. An audit trail section 525 of an account record 500 contains a list of all events where the account record 500 is accessed. Each time an account record 500 is accessed or modified, for example, by an administrator or the network information provider, an entry is produced. The entry may describe the account access and/or modification event. The entry is appended to an audit trail section 530 of the administrator or network information provider account that initiated the event. The audit trail information may then be used to help generate a history of transactions made by the account owner under the account.

The advertising information section 530 contains information about the network information provider. The advertising data 530 for each user account 500 may be organized as sub-accounts 540. Each sub-account 540 comprises at least one search listing 544. Each search listing corresponds to a bid on a search term. A network information provider may utilize sub-accounts to organize multiple bids on multiple search terms, or to organize bids for multiple web sites. Sub-accounts may also be used by network information providers to track the performance of targeted market segments. The sub-account is introduced for the benefit of the network information providers seeking to organize advertising efforts, and does not affect the method of operation of the embodiments. Alternatively, the advertising information section need not include the sub-accounts, but may include one or more search listings.

The search listing 544 corresponds to a search term/bid pairing and contains information to conduct the online competitive bidding process. Preferably, each search listing includes information regarding a search term 552, web site description 554, URL 556, payment amount 558, title 560, and a determined time period 570. The search term 552 includes one or more keywords which may be common words in English or another language. The keywords include a character string. The search term is an object of the competitive online bidding process. The network information provider selects a search term to bid on that is relevant to the content of the network information provider's web site. The network information provider may select search terms that are targeted to terms likely to be entered by searchers seeking information on the network information provider's web site. Less common search terms may also be selected to ensure comprehensive coverage of relevant search terms for bidding.

The web site description 554 is a textual description of the content of the network information provider's web site. A length of the textual description can be limited, for example, to 190 characters. The web site description 554 may be displayed in the search result list. The search listing 544 may also contain a title 560 of the web site that may be displayed as the hyperlinked heading. The URL 556 contains the Uniform Resource Locator address of the network information provider's web site. When the user clicks on the hyperlinked heading, the URL is provided to the browser program to access the network information provider's web site. The URL may also be displayed as part of the search listing in the search result list.

The bid amount 558 preferably is a money amount bid by a network information provider for a listing. This money amount may be deducted from an account of the network information provider or may be later billed to the network information provider. In one embodiment, bids, winners and prices are recorded successively for a number of auctions. The recorded data may used to establish reserve prices for terms and rank combinations in future auctions, to maximize total auction-based ranking revenue.

An auction-based ranking may be introduced, for example, for week-long tenancies on selected search terms. The ranks available for bidding in the auction-based ranking may be limited, for example, to the top 5 ranks. By way of example, network information providers may bid for tenancy in search results for the period from Monday through Sunday of a specified week, with the auction-based ranking closing at a defined time the preceding week, e.g. Friday at noon Pacific time. Closing and costs are provided as discussed above for the daily auction-based ranking. Reserve prices for the weekly auction-based ranking can be set based on the data obtained from the daily auction-based rankings, based on data for prior weekly auction-based rankings, or by other revenue management methods. The ranks that do not meet the reserve price may be bid in the daily auction-based rankings as the days of that week occur in the daily auction-based ranking.

Other time periods for auction-based rankings could be used, such as an auction-based ranking for 4-week or month-long period. Unsold month-long rankings can enter the weekly auction-based rankings and daily auction-based rankings. The auction-based ranking period may also be extended to quarter-long, or three month, tenancies or other periods. For example, the period may be tailored to maximize a desired level of committed revenue to the operator of the auction-based ranking site. Preferably auction-based rankings for longer tenancies are restricted to the top three ranks.

In one embodiment, the operator can offer the network information provider placement in the search result list by ways other than, or in addition to, the auction-based ranking. In some situations, for example, the year-end holiday shopping season, the operator of the search engine can obtain premiums for search listings. For example, the network information provider can pay a premium for a guaranteed top rank for selected search terms during the holiday shopping season. Or the network information provider can pay a premium or a guaranteed rank for selected search terms during a new model introduction campaign. The network information provider may also pay a premium for a guaranteed future spot in an auction-based ranking where the network information provider presently has to plan marketing spending.

Referring again to FIG. 4, at blocks 420 and 422, after bidding is disabled for rank R, a processing thread is initiated to process the bids, for example, determine a winning bidder, for search terms for rank R. At block 424, the thread ends when the processing ends.

Figure 6:
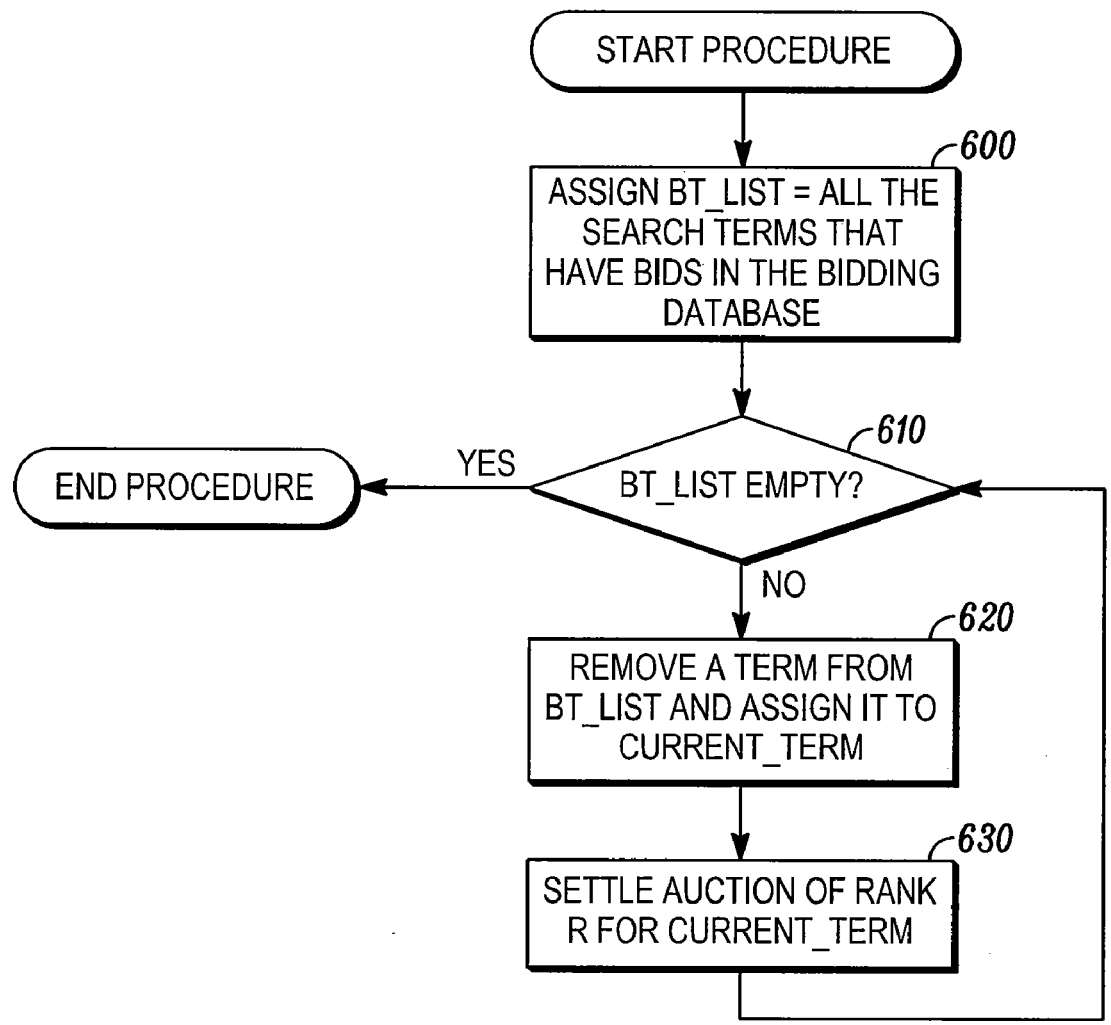
FIG. 6 is a flow diagram illustrating one process to determine a winning network information provider for a particular rank.

FIG. 6 is a flowchart illustrating a way to process bids for a specified rank R. At block 600, a list, for example, BT_LIST, is formed of search terms for which at least one bid is present for this auction-based ranking in the bidding database. The bids entered at block 410 of FIG. 4 can be retrieved from a bidding database, such as a database stored in storage 32.

Figure 7:
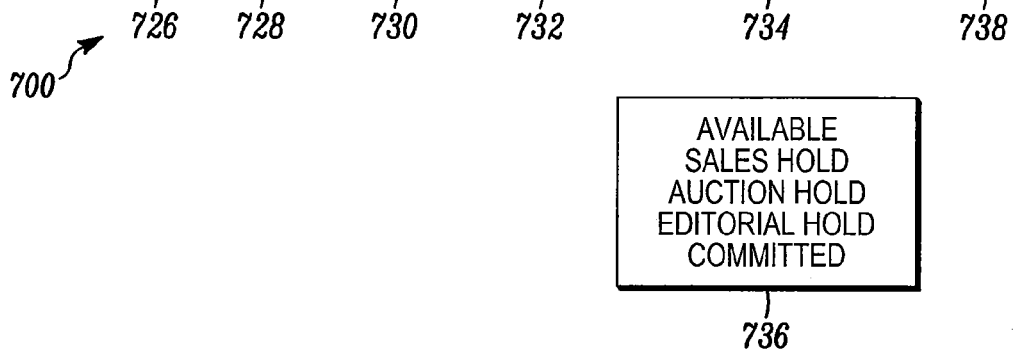
FIG. 7 illustrates an exemplary structure for a bidding database, including an inventory database and an auction-based ranking database.
Figure 7:

FIG. 7 illustrates an exemplary structure for the bidding database, including an inventory database 700 and an auction database 710. The auction database 710 includes a start field 712, a duration field 714, a search term field 716, a rank field 718, a listing_ID field 720, a bid field 722 and a timestamp field 724. The start field 712 stores a start time for which the network information provider is bidding. For example, the network information provider may be bidding for a rank 260a-h that starts at 1:00 a.m. the next day. The duration field 714 stores a value that indicates the duration that the advertisement is displayed, for example, one week. The search term field 716 stores the search term and the rank field 718 stores the rank for which the network information provider is bidding. The bid field 722 stores the bid price and the timestamp field 724 stores the time that the bid was made. The time that the bid was made can be used to break ties if two or more network information providers tied for the highest bid. The winner can be the network information provider that was first to bid the highest bid. The listing_ID field 720 stores an operator assigned serial number or hash code that the operator can use to reference the listing, so that the auction-based ranking database information for a particular listing can be associated together. A hash code is an algorithmically-determined value that associates a list of items stored in a hash table.

The inventory database 700 includes a day field 726, a search term field 728, a rank field 730, a listing_ID field 732, a status field 734 and a cost field 738. The status field includes statuses 736 such as available, sales hold, auction hold, editorial hold and committed. The inventory table 700 stores information regarding a status for a search result, i.e., information regarding a particular rank for a particular search term on a particular day. For example, rank 3 could be available for the search term "car" for tomorrow. A sales hold indicates that the rank for a search term for the specified day has been held by the operator, for example, to sell or populate the listing in a way other than the auction-based ranking. An auction hold indicates that the rank for the search term for the specified day will be or is currently being auctioned. An editorial hold could indicate that the search term is being held for editorial reasons. For example, the search term "World Trade Center" could be withheld from the auction-based ranking so that the term can be donated to charities. A committed status could indicate that the rank for the search term for the specified day has been committed to a particular listing, e.g. because it has already been sold. The cost field 738 stores the cost of the rank for the particular search term for the particular day. The listing_ID field 732 stores an operator assigned serial number or hash code that the operator can use to associate together the listing information.

Referring again to FIG. 6, at block 610, the process to create a list of bidders for a specified search term ends if the BT_LIST is empty, i.e., if no search terms for which bids exist remain unprocessed. At block 620, if the BT_LIST is not empty, a term is removed from the BT_LIST and designated as a current term to be processed. At block 630, the auction-based ranking is settled for rank R of the current term being processed. At block 610, the process determines whether the BT_LIST is empty. At block 620, if the BT_LIST is not empty, a term is removed and designated as the current term to be processed. At block 630, the auction-based rankings are settled for rank R for the current term. The process continues until BT_LIST is empty, when the auction-based rankings have been settled for rank R for all search terms for which bids were obtained.

Figure 8:
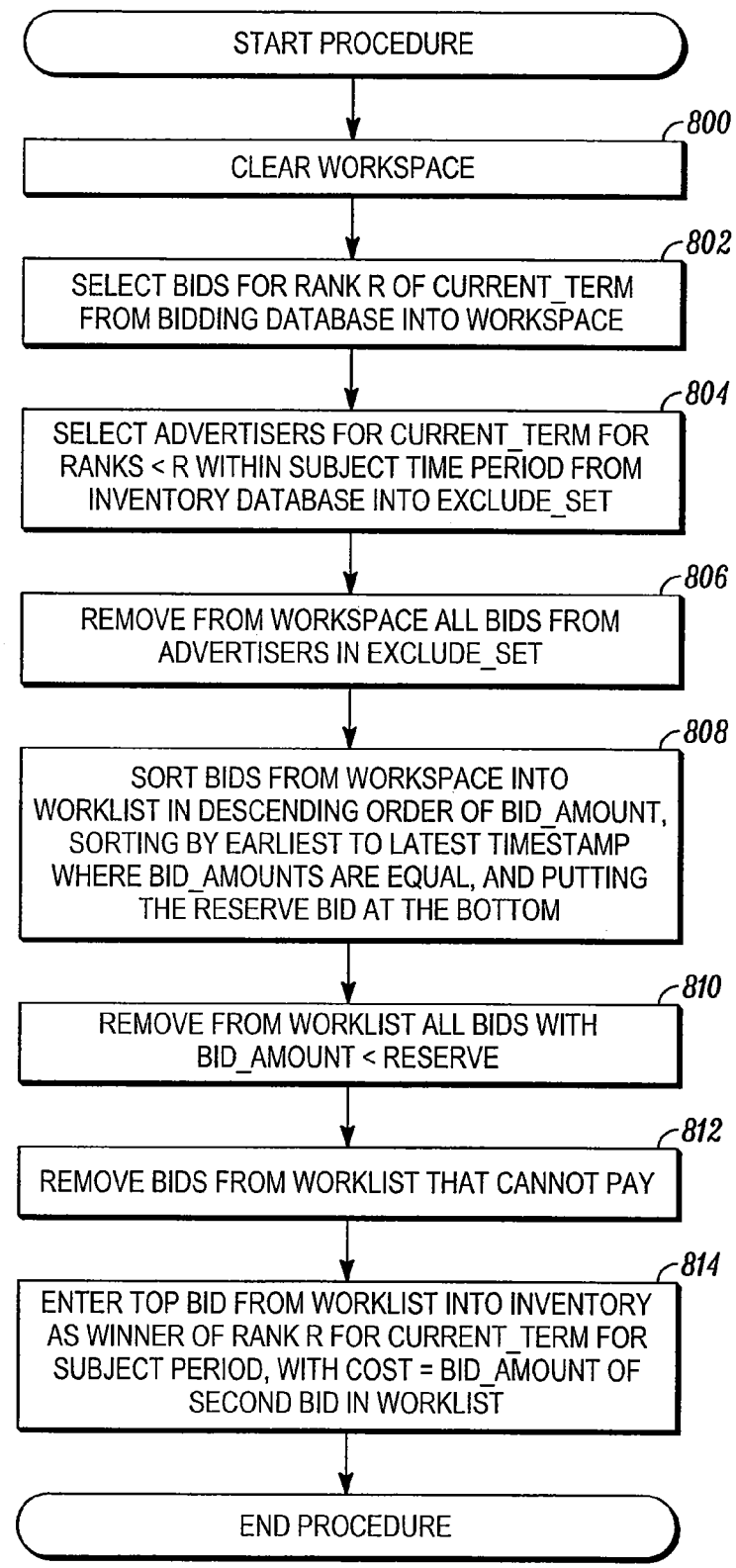
FIG. 8 is a flow diagram illustrating a procedure for settling the auction-based ranking for a current search term.

FIG. 8 is a flowchart illustrating a way to determine the winner of an auction-based ranking for a search term at a particular rank. At block 800, the process initiates a workspace, for example, clears a table to store search terms and bid amounts from the network information providers for rank R. At block 802, bids for rank R of the search term are entered into a work list of the workspace. At block 804, the process determines whether any of the listed network information providers were winners of another rank for the same search term and the same time period. In one embodiment, the network information provider can win for at most one rank for a particular search term displayed at a particular time. At block 806, bids from network information providers that won for another rank are removed from the work list so that the network information provider's bid is not considered for rank R. Alternatively, an auction-based ranking operator could allow a network information provider to win more than one rank per search term for a particular time.

At block 808, listings are sorted by bid amount in descending order and from earliest to latest timestamp when bid amounts are equal. At block 810, if the auction was conducted with reserve, listings are removed that include bid amounts less than the reserve price. At block 812, listings are removed in which the network information provider cannot pay the bid amount. For example, the network information provider can have an account, including an account balance, with the operator. If the account balance is lower than the bid amount, the listing is removed. Alternatively, payment can be secured in other ways such as by charging a credit card account. The credit account could be charged the auction-determined cost for the ranks the network information provider won for various search terms.

Figure 9:
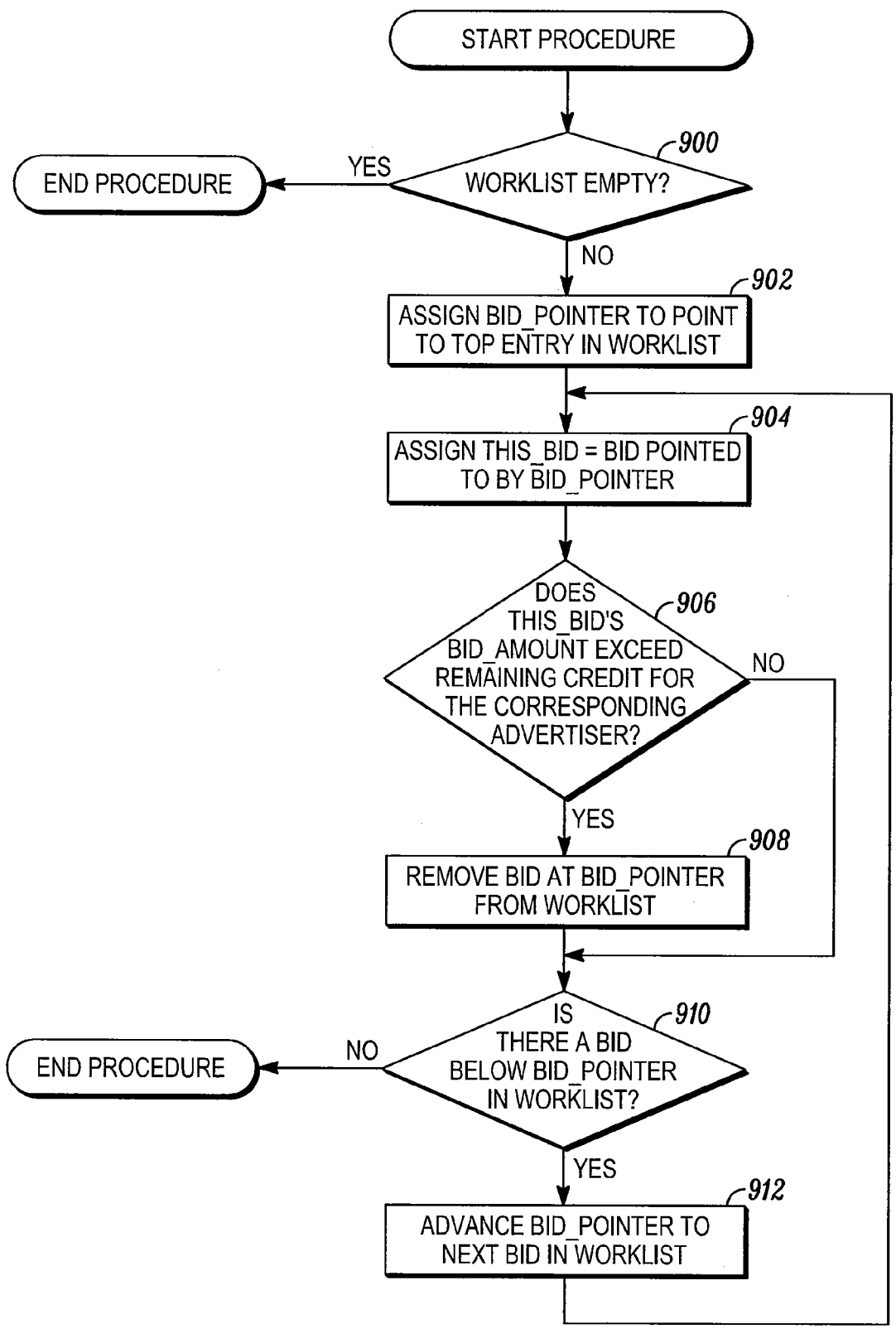
FIG. 9 is a flow diagram illustrating a procedure for removing bids of network information providers that cannot pay.

FIG. 9 is a flow chart illustrating a way to remove bids from the work list that the network information provider cannot pay. At block 900, if the work list is empty the removal procedure ends. At block 902, if the work list is not empty, a BID_POINTER is assigned to point to an entry in the work list, for example, to point to the top entry. At block 904, the working variable THIS_BID is assigned the value of the bid pointed to by the pointer BID_POINTER. At block 906, the bid amount for THIS_BID is compared to the credit available to the corresponding network information provider. At block 908, if the bid amount for THIS_BID exceeds the available credit, the bid located at BID_POINTER is removed from the work list. At block 910, the procedure determines whether unchecked bids remain on the work list. For example, it is determined whether a bid is located below the BID_POINTER on the work list. If no unchecked bids remain the removal procedure ends. If unchecked bids remain in the work list, at block 912 the BID_POINTER is moved to the next bid in the work list, and the procedure continues at block 904.

Referring again to FIG. 8, at block 814, if the bids are sorted from highest to lowest on the work list, the network information provider remaining at the top of the work list becomes the winner of rank R for the current term and the specified period. According to a second price auction-based ranking, the network information provider is charged the bid amount of the second highest bid on the work list. Alternative to removing all of the network information providers that cannot pay from the work list, the process may be changed to first determine if the highest bidder can pay. If payment fails, for example, the credit card is refused or an invoice credit limit exceeded, the next-highest bidder in the auction-based ranking can be awarded the rank and charged an amount based on the effective withdrawal of the previous highest bidder. If the next highest bidder cannot pay, the next highest bidder after that is charged, and so on, until a network information provider is discovered that can make payment. If none of the bidders can pay, other ways can be used to fill the rank. For example, the auction-based ranking can be re-opened to accept new bids or a listing can be selected by a manual or algorithmic process.

Figure 10:
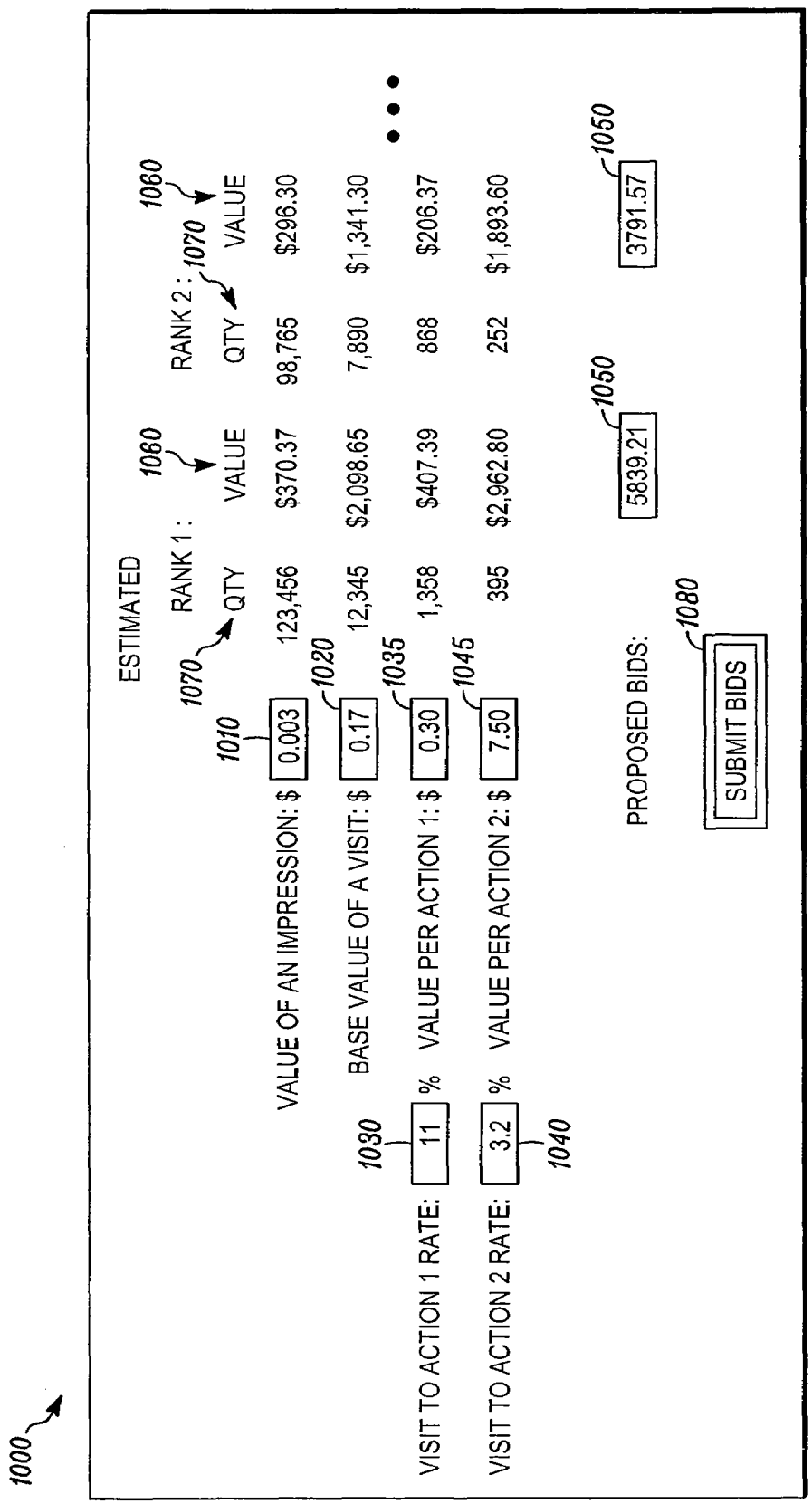
FIG. 10 illustrates an exemplary screen display of bidding tool for estimating bids according to one embodiment.

FIG. 10 illustrates an exemplary screen display according to one embodiment of a bidding tool 1000 that a network information provider can use to help determine bid amounts for an auction-based ranking such as the one described above. The bidding tool 1000 includes fields in which a user, such as the network information provider, can input values. The input fields include a field to specify a value per expected impression 1010 and a value of a visit 1020 from the search requester to the network information provider's web site.

To facilitate calculating the expected value to a network information provider of winning the auction-based ranking, the bidding tool 1000 may also provide for a network information provider to enter numbers corresponding to one or more particular events of interest to the network information provider.

In one embodiment the network information provider can input a percentage rate that a visit will lead to a first action 1030 occurring, and a value 1035 to the network information provider of the first action occurring. The first action can include, for example, the search requester navigating to a particular area of the network information provider's web site. The network information provider can also input a percentage rate that a second action 1040 will occur and a value 1045 of the second action occurring. The second action can include, for example, the search requester purchasing an item from the network information provider's web site. The amount and type of actions used with the bidding tool 1000 is implementation dependent and can vary. In one embodiment of the bidding tool the network information provider can add another actions to the list of actions, until all actions of interest to the network information provider have been entered.

For each rank 260*a-h*, a proposed bid 1050 can be calculated. The proposed bid 1050 equals the sum of the values 1060 calculated for each event. For example, the value of an expected impression is the value per impression 1010 multiplied by the quantity 1070 of times that the action is expected to occur. The quantity 1070 can be determined in various ways. For example, the quantity can be input by an operator of the search engine or the network information provider. The quantity 1070 can be estimated or calculated using statistical or other formulas. The formulas can use information such as an actual number of times that searchers have previously observed a listing of the particular rank.

Values are also determined for the other events. The value of the expected number of searcher visits to the network information provider's web site is computed as the base value of a visit 1020 multiplied by the expected quantity of visits (in this example 12,345 for Rank 1). The expected total value of the searchers anticipated to perform a given action, such as action 1, is the value of action 1 multiplied by the quantity 1070 of times that action 1 is expected to occur. The quantity of times that action 1 is expected to occur can equal the quantity of visits (e.g. 12,345) multiplied by the percentage of time that action 1 occurs in a typical searcher visit, i.e., the action 1 rate 1030 (e.g. 11%). Moreover, the quantity of times that action 2 is expected to occur can equal the quantity of visits expected (e.g. 12,345) multiplied by the visit to action 2 rate (e.g. 3.2%). After the network information provider enters the information, the network information provider can click the submit bid button 1080 to submit the proposed bids 1050 for all the ranks. In this manner, each bid is adapted to the expected value to the network information provider of the listing appearing in the corresponding rank. The network information provider can also enter any variation of the amount, either higher or lower than the proposed bids 1050, as the network information provider chooses. The proposed bids 1050 can be used as a guideline.

By way of one example, a value to a network information provider of an impression 1010 can be determined to be $0.003, for example, for the branding value in being observed at that rank. An expected quantity 1070 of impressions is 123,456 for rank 1 and 98,765 for rank 2. Thus, a value to a network information provider based on the expected number of impressions for rank 1 is $370.37 and for rank 2 is $296.3. A base value of a visit 1020 can be determined to be $0.17. For example, a visit, even if it does not result in a sale or subsequent action today, may nevertheless increase the future probability of a business relationship. An expected quantity of visits, for example, by searchers during the time period being auctioned, to the network information provider's web site, is 12,345 for rank 1 and 7,890 for rank 2. Thus, a value to the network information provider for the expected number of visits to the network information provider's web site for rank 1 is $2,098.65 and for rank 2 is $1,341.30, should the network information provider's listing appear.

The percentage of times that action 1 occurs could be 11% of the searcher's visits to the network information provider's web site. The percentage rate may be entered by the network information provider. The percentage rate may also be entered in other ways, such as by being determined by performance tracking utilities. The performance tracking utilities may make a statistical estimation of the rates of various actions based on historically-observed visitor behavior.

The number of times that action 1 will occur regarding rank 1 can be calculated as 1,358 (12,345×11%) and a number of times that action 1 will occur regarding rank 2 can be calculated as 868 (7,890×11%). A value to a network information provider of action 1 occurring could be determined to be $0.30 (thirty cents). A value to the network information provider of all the action 1's expected to occur if the listing appears in rank 1 can be calculated as $407.39 (1,358×0.30) and a value to the network information provider of all the action 1's expected to occur if the listing appears in rank 2 can be calculated as $206.37 (868×0.30). The percentage of times that action 2 occurs could be determined to be 3.2% of the searcher's visits to the network information provider's web site. Thus, an expected number of times that action 2 may occur regarding rank 1 is 395 (12,345×3.2%) and an expected number of times that action 2 may occur regarding rank 2 is 252 (7,890×3.2%). A value to the network information provider of action 2 occurring could be determined to be $7.50. A value to the network information provider of all the action 2's expected to occur if the listing appears in rank 1 can be calculated as $2,962.80 (395×7.50) and a value of all the expected action 2's for rank 2 can be calculated as $1,893.60 (252×7.50). By adding the expected values determined for rank 1, a proposed bid of $5,839.21 can be calculated for rank 1. By adding the values determined for rank 2, a proposed bid of $3,791.57 can be calculated for rank 2. Further calculations may be performed for rank 3 and other lower ranks, including all ranks available in the auction-based ranking.

By way of another example, a network information provider might determine from examination of web logs or other ways that traffic delivered by the operator has a 7% conversion rate to a sale, i.e. that one in fourteen users who click through on the listing URL subsequently makes a purchase on the network information provider's site. The network information provider may value a sale on average at $5.00. Further, the network information provider may have observed a 20% conversion rate from clickthrough to request for product information, and value this action at $1.00. The network information provider may also value a clickthrough itself at $0.05. Further the network information provider may value appearing in the search results at the particular predetermined rank at $0.003 (three-tenths of a cent), for the general branding value.

In addition to calculating a bid from the network information provider's input, taking into account all the different potential values expressed by the network information provider, information can be used to determine an expected number of impressions and clickthroughs to the network information provider. A calculation can be performed by multiplying the values of various events by the expected number of such events, and summing the component values for those events. An expected number of impressions for a determined period may be 100,000, and an expected number of clicks at that determined rank for that period may be 10,000. The proposed bid can be calculated as:

$0.003×100,000+$0.05×10,000+$5.00×7%×10,000+ $1.00×20%×10,000=$300+$500+$3,500+$2, 000=$6,300.

This bid is proposed for a particular rank during the particular time period corresponding to the estimates of event quantities.

A network information provider may enter a target values for one or more search terms. A bid can be calculated at each rank to result in an expected average cost-per-click ("CPC") (or maximum expected average CPC if the second-price auction format is used). The calculation can be accomplished by multiplying the per-click bid by the expected number of clicks at each rank, as determined by the operator from historical traffic data. The expectation value of number of clicks may be determined by known statistics, for example by taking a weighted average of several prior periods. The resulting calculated bids may then optionally be adjusted by the network information provider and then be submitted to the auction-based ranking.

By way of another example, rank 1 of a particular search term may have an expectation value of 400 clicks, rank 2 has a 300 click expectation value, rank 3 has a 200 click expectation value, rank 4 has an 80 click expectation value, and rank 5 has a 50 click expectation value. A network information provider might choose a target per-click value of $0.25. Bids could be proposed of $100 for rank 1, $75 for rank 2, $50 for rank 3, $20 for rank 4, and $12.50 for rank 5. The network information provider could alter the bid for rank 1 to be $120, perhaps because this network information provider values top placement at a premium for branding reasons. The network information provider could then submit the ensemble of bids.

The network information provider may also use a system of bids by default. Bids by default represent standing bidding instructions. For example, "Bid this amount for this search term & rank combination for the current auction and subsequent auctions of the same duration of tenancy, until further instructed." Bids by default allow a network information provider to participate in a succession of auction-based rankings without having to re-enter bids for every auction. Optionally the bidding instructions to the bidding tool may take the form "Calculate and submit bids such that the expected cost-per-click limit value for this term is the network information provider determined amount, until further instructed." The instructions can be limited to certain ranks. The standing instruction can benefit the search engine operator by increasing network information providers' bids as click traffic increases, for example from an increased numbers of performed searches.

Other ways could also be used to facilitate network information provider participation. The ways include determining appropriate search terms on which to bid, organizing sets of search terms and performing actions on all members of the sets.

The above-described system and method may allow a network information provider to secure a defined placement for a determined period of time at a set cost. The determined parameters enable the network information provider to incorporate search results placement in a planning process such as media or promotional planning. For example, according to one embodiment, a consumer electronics chain can secure placement for the month of November in various search terms related to consumer purchases for Christmas gifts. The chain's marketing team can secure placement for the entire month, and can determine the cost of that placement. The determination enables a marketing team to incorporate search placement spending as a significant proportion of total marketing spending for that period.

Various embodiments can also remove the need for the network information provider to constantly monitor search listings for which the network information provider wishes to maintain a particular rank, or alternately, to manage the network information provider's spending to a particular value. The need for continuous monitoring by the network information provider can lead to a reduced participation by network information providers in some cases, and the expenditure of significant personnel resources in other cases.

Various embodiments permit the results of searches for a fixed subsequent period, e.g. tomorrow, to be determined and fixed many hours in advance on a defined schedule, and unchanging for the entire period. Thus, the search operator can employ less advanced content publishing means to distribute search results to the web servers, with long timeframes. The content can be staged on the search servers and subjected to quality assurance tests to allow for corrective action should the publication distribution process have failed. The staging occurs without loss of revenue or degradation of the quality of the search result listings.

The search result servers may be able to operate more efficiently, since the servers are required to serve content that is fixed for an entire day. A traditional web server such as Apache can be employed, serving directly from the file system with little or no modification, without interaction with a database, resulting in high specific performance and simplified administration.

Regarding various embodiments, further advantages can be obtained from the disclosed pricing format. Since the auction-based ranking can be conducted with defined periodic closing periods, the auction-based ranking can accommodate both established and to be developed auction formats. In one embodiment the auction-based ranking is a sealed-bid second-price auction, sometimes known as a Vickery auction. The Vickery auction format allows bidders to bid the actual full value to the network information provider of each placement, without regard to what other network information providers may bid. This may simplify bidding for a network information provider and provide higher revenues to the search engine operator. Also, the sealed-bid format can reduce the rate at which network information providers can act collusively to work against the search engine provider. The sealed-bid also increases the incentive to "cheat" on collusive arrangements, and thus discourage collusive arrangements, because the cheater would obtain a full period's worth (day, week, month or quarter, etc.) of value.

Various embodiments do not require the search operator to track each clickthrough on a search result, when the network information provider is not charged per click. Instead the search operator may employ statistical sampling methods. An advantage to the statistical sampling that may be employed includes a reduction for the operator in the resources required to track and process clicks. One embodiment utilizes click information to provide estimates to network information providers of expected number of clicks for terms at ranks. Statistical sampling methods may be applied, in which some defined fraction of clicks are recorded and analyzed. The sampling may take the form, for example, of a sampling system at each search results server that selects for serving at a defined rate, e.g. 1% of total searches, a search results file having redirect URL's. A clickthrough on a redirect URL may result in a web server response to the browser having a destination URL and directing the browser to automatically request the destination URL as if it were clicked by the searcher. For the remaining searches, e.g. 99%, the search results server can serve a search results file having URL's which link directly to the network information providers' sites. Such sampling may be done randomly rather than periodically, by, for example, generating a random number between zero and one, multiplying that number by the sampling fraction reciprocal (100 in the case of 1% sampling, because one of every 100 clicks is to be sampled), and selecting the results file having redirect URL's if the product is less than one. The sampling fraction reciprocal is preferably a configuration parameter of the search servers, so that the sampling may be adjusted as traffic trends vary to maintain appropriate sampling.

As traffic increases, the sampling fraction can be decreased to maintain an approximately constant load on a redirect server while maintaining constant statistical significance in the results. A five times increase in traffic is balanced by increasing the sampling fraction reciprocal by a factor of five. Increasing the sampling fraction reciprocal reduces by ⅕th the previous value of probability that a given search result will include redirect URL's, which balances the five times increase in clicks to maintain a constant sample size.

The foregoing detailed description should be regarded as illustrative rather than limiting and the appended claims, including all equivalents, are intended to define the scope of the invention.

I claim:

1. A computer implemented method of auctioning the placement of advertisements on a website through a distributed computer system, comprising:
   providing, through the distributed computer system, a plurality of actual ranking positions and a search result list containing the actual ranking positions; and
   auctioning, through the distributed computer system, the actual ranking positions in the search result list for a determined display period during which advertisements are displayed at the actual ranking positions in the search result list.

2. The method of claim 1, wherein after the auction closes, winning bidders are guaranteed the actual ranking positions in the search result list during the determined display period.

3. The method of claim 1, wherein the auction of the actual ranking positions is open during a determined time period.

4. The method of claim 2, further comprising:
   preparing the search result list for the determined display period such that advertisements corresponding to the winning bidders for the actual ranking positions are arranged in the actual ranking positions.

5. The method of claim 1, wherein the determined display period comprises a portion of a holiday season.

6. The method of claim 1, wherein the actual ranking positions are auctioned consecutively.

7. The method of claim 1, wherein if the winning bidder for one of the actual ranking positions had bids on any lower actual ranking positions, the bids on any lower actual ranking positions are removed from consideration.

8. The method of claim 1, wherein the search result list is for a search term, and wherein the search result list is displayed by a search engine.

9. A computer system for managing auctions of actual ranking positions in a search result list, comprising:
   a computer readable storage medium including a bidding database that stores:
      information about actual ranking positions; and
      information about bids in an auction for the actual ranking positions;
      wherein the actual ranking positions are for ranking positions in a search result list for a determined display period; and
   a processor configured to receive and store the information about bids in the auction for the actual ranking positions.

10. The system of claim 9, wherein the processor is further configured to generate a search result list from the information about actual ranking positions and the information about bids in the auction for the actual ranking positions, and wherein the search result list comprises search listings of winning bidders of the auction for the actual ranking positions.

11. The system of claim 9, wherein the bidding database stores status information about the actual ranking positions comprising a designation of one of the following: available, sales hold, auction hold, editorial hold, and committed.

12. The system of claim 9, wherein the search result list is for a determined search term.

13. The system of claim 9, wherein the distributed computer system is configured to transmit at least a portion of one of the information about actual ranking positions or the information about bids in the auction for the actual ranking positions to a third-party web server.

14. A computer system for generating a search result list, comprising:
- a first computer readable storage medium including an inventory database that stores information about actual ranking positions for a determined search term for a determined display period;
- a second computer readable storage medium including an auction database that stores information about bids for the actual ranking positions for a determined search term for a determined display period; and
- a search engine web server that includes a search database including search listing records; and
- wherein the search engine web server is configured so that when it receives a query, the search engine web server generates and transmits a search result list page, wherein a plurality of actual ranking positions on the search result list page correspond to winning bidders in the auction for the actual ranking position for the search term for a determined display period.

15. The system of claim 14, wherein the search engine web server includes a search engine web page configured to allow a searcher to input the query.

16. The system of claim 14, wherein the query is forwarded to the search engine web server from a third-party web server.

17. The system of claim 14, wherein the search engine web server generates and transmits the search result list page substantially in real time.

18. The system of claim 14, wherein actual ranking positions which were not successfully bid on are generated by a search engine utilizing an objective distributed database and a text searching algorithm.

* * * * *